United States Patent [19]

Wellendorf et al.

[11]  4,231,069
[45]  Oct. 28, 1980

[54] METHOD AND APPARATUS FOR PRODUCING IMAGE COMBINATIONS

[75] Inventors: Klaus Wellendorf, Kitzberg near Kiel; Ruediger Sommer, Raisdorf, both of Fed. Rep. of Germany

[73] Assignee: Dr. Ing. Rudolf Hell GmbH, Fed. Rep. of Germany

[21] Appl. No.: 903,878

[22] Filed: May 8, 1978

[30] Foreign Application Priority Data

May 10, 1977 [DE] Fed. Rep. of Germany ....... 2720944

[51] Int. Cl.³ .......................... H04N 1/00; H04N 1/38
[52] U.S. Cl. ..................................... 358/256; 358/280; 358/283
[58] Field of Search ................. 358/256, 258, 283, 75, 358/77, 78, 183, 280; 354/6

[56] References Cited

U.S. PATENT DOCUMENTS

| | | | |
|---|---|---|---|
| 3,819,854 | 6/1974 | Kolb | 358/78 |
| 3,904,816 | 9/1975 | Taudt | 358/256 |
| 4,007,362 | 2/1977 | Sindermann | 358/280 |
| 4,075,663 | 2/1978 | Wellendorf | 358/283 |

FOREIGN PATENT DOCUMENTS 1347465  2/1974  United Kingdom ...................... 358/75

Primary Examiner—Robert L. Griffin
Assistant Examiner—Joseph A. Orsino, Jr.
Attorney, Agent, or Firm—Hill, Van Santen, Steadman, Chiara & Simpson

[57] ABSTRACT

Apparatus and method for producing image combinations in which the image to be copied are digitally stored and a mask is produced for manually superimposing the images with each other with one of the images and the mask being scanned and wherein the coordinates of the image which is to be transferred into the other image are measured as x and y values and the two images are combined by utilizing the x and y values to form a composite total image.

12 Claims, 13 Drawing Figures

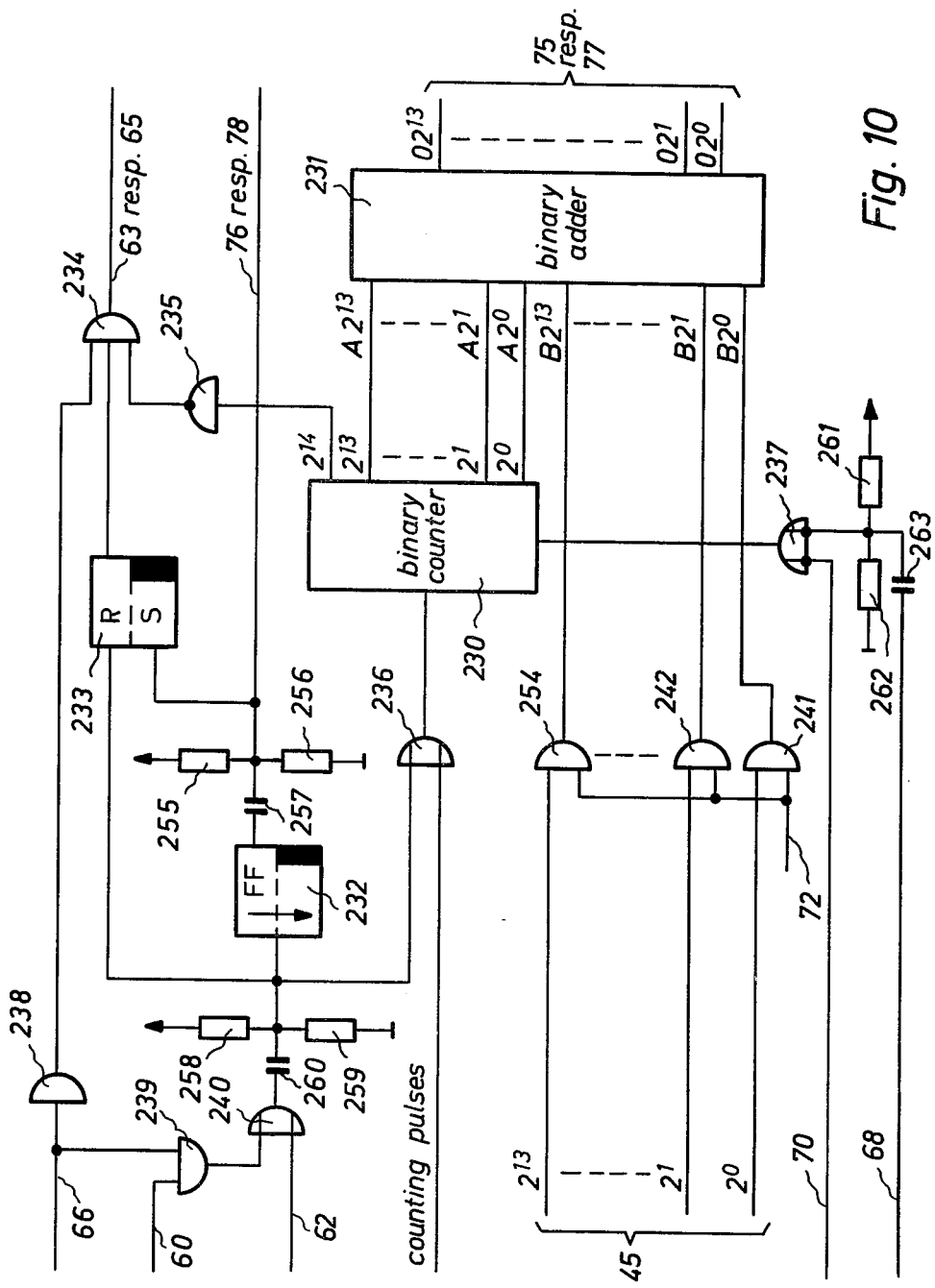

table 11

11a

| pel* no. | sign R |
|---|---|
| 0  | 0 0 0000 |
| 1  | 0 0 0001 |
| 2  | 0 0 0010 |
| 3  | 0 0 0011 |
| 4  | 0 0 0100 |
| 5  | 0 0 0101 |
| 6  | 0 0 0110 |
| 7  | 0 0 0111 |
| 8  | 0 0 1000 |
| 9  | 0 0 1001 |
| 10 | 0 0 1010 |
| 11 | 0 0 1011 |
| 12 | 0 0 1100 |
| 13 | 0 0 1101 |
| 14 | 0 0 1110 |
| 15 | 0 0 1111 |

11b

| ΔX=+3 | sign R |
|---|---|
| +3 | 0 0 0011 |

11c

| sign R | buffer address |
|---|---|
| 0 0 0011 | 3 |
| 0 0 0100 | 4 |
| 0 0 0101 | 5 |
| 0 0 0110 | 6 |
| 0 0 0111 | 7 |
| 0 0 1000 | 8 |
| 0 0 1001 | 9 |
| 0 0 1010 | 10 |
| 0 0 1011 | 11 |
| 0 0 1100 | 12 |
| 0 0 1101 | 13 |
| 0 0 1110 | 14 |
| 0 0 1111 | 15 |
| 0 1 0000 | 0 |
| 0 1 0001 | 1 |
| 0 1 0010 | 2 |

11a

| pel* no. | sign R |
|---|---|
| 0  | 0 0 0000 |
| 1  | 0 0 0001 |
| 2  | 0 0 0010 |
| 3  | 0 0 0011 |
| 4  | 0 0 0100 |
| 5  | 0 0 0101 |
| 6  | 0 0 0110 |
| 7  | 0 0 0111 |
| 8  | 0 0 1000 |
| 9  | 0 0 1001 |
| 10 | 0 0 1010 |
| 11 | 0 0 1011 |
| 12 | 0 0 1100 |
| 13 | 0 0 1101 |
| 14 | 0 0 1110 |
| 15 | 0 0 1111 |

11d

| ΔX=-3 | sign R |
|---|---|
| -3 | 1 1 1101 |

11e

| sign R | buffer address |
|---|---|
| 1 1 1101 | 13 |
| 1 1 1110 | 14 |
| 1 1 1111 | 15 |
| (1)0 0 0000 | 0 |
| (1)0 0 0001 | 1 |
| (1)0 0 0010 | 2 |
| (1)0 0 0011 | 3 |
| (1)0 0 0100 | 4 |
| (1)0 0 0101 | 5 |
| (1)0 0 0110 | 6 |
| (1)0 0 0111 | 7 |
| (1)0 0 1000 | 8 |
| (1)0 0 1001 | 9 |
| (1)0 0 1010 | 10 |
| (1)0 0 1011 | 11 |
| (1)0 0 1100 | 12 |

*pel = picture element

METHOD AND APPARATUS FOR PRODUCING IMAGE COMBINATIONS

BACKGROUND OF THE INVENTION

1. Field of the Invention

This invention relates in general to methods and apparatus for reproducing image patterns.

2. Description of the Prior Art

A method for dot and line-wise reproduction of image patterns has been described in U.S. Pat. No. 3,904,816 where under digital intermediate storage of image signal sequences obtained line-wise, at least two associated image signal sequences are stored and withdrawn from storage synchronously and where the reproduction is influenced by either the functions of certain characteristic values of an image signal sequence or from both image sequence signals.

This method is applied in the reproduction technique if images are copied into each other and the image data have previously been digitally stored. Such method has the advantage of offering great flexibility in conjunction with high safety in the production of printing cuts by obtaining variations and combinations of image patterns.

In a typical application for example, two image originals may be present with image I being a background and image II being an object which is to be combined with the background. Usually the images are not available in the necessary size or in the required cut-out so that second originals have been produced in a separate operation which have the necessary final scale and cut-out for the particular desired combination. A mask is produced manually from the image to be copied into the background. The second originals and the masks are scanned stored digitally and used according to the method described in U.S. Pat. No. 3,904,816.

However, it happens that the position of the image II to be copied within image I does not precisely match. In that case, a new corrected mask would have to be produced and the operation of overprinting would have to be repeated which is time consuming and costly.

An additional disadvantage of this method of the prior art resides in the fact that a second original must be produced from each original in the corresponding scale and with the corresponding cut-out and the original then must be scanned and the data thus obtained must be stored. Hence, an additional optical reduction printing operation is necessary causing increased expenditure in time and money and a reduction in the quality of the image data.

SUMMARY OF THE INVENTION

The present invention relates to an improved method and apparatus for the combination of images which makes it possible to start out from the digitally intermediate stored data of the original images which is already available and in which the position of the subject image to be overprinted for the one image is determined in the other one accurately in a single operation. A mask is drawn and scanned from the image which is to be copied in the other image and the data which locates the position of the image is determined so that the image can be shifted to the proper position for imprinting into the other image. The shifting in the scanning direction and transversely to the scanning direction is determined in the x and y directions which are converted into x and y values and utilized to produce the composite image.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 10 is a block diagram of the address control; and

FIG. 11 illustrates tables 11a through 11e for illustrating the address conversion.

DESCRIPTION OF THE PREFERRED EMBODIMENTS

Figure 1A:
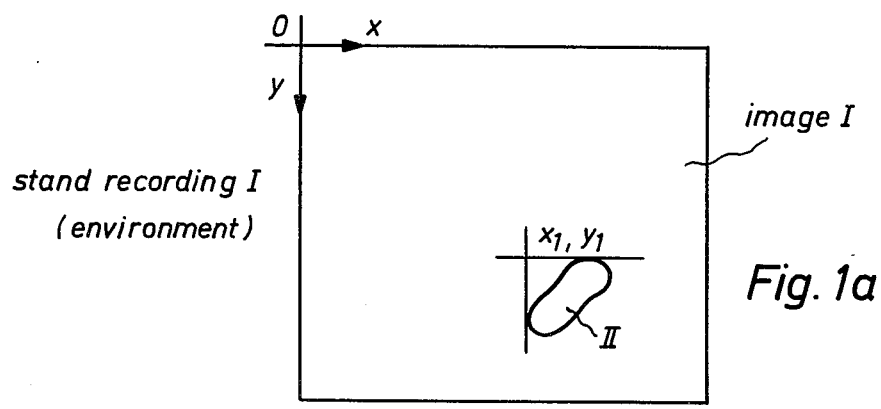
FIGS. 1a, 1b and 1c are schematic representations of images and masks to be processed.
Figure 1B:
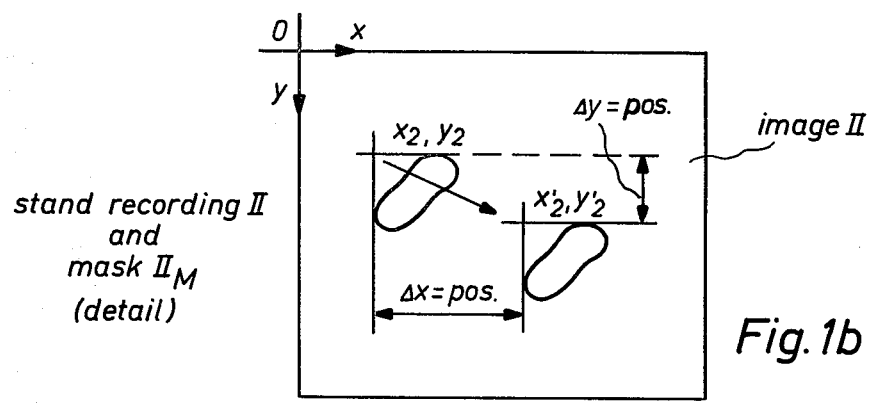
Figure 1C:
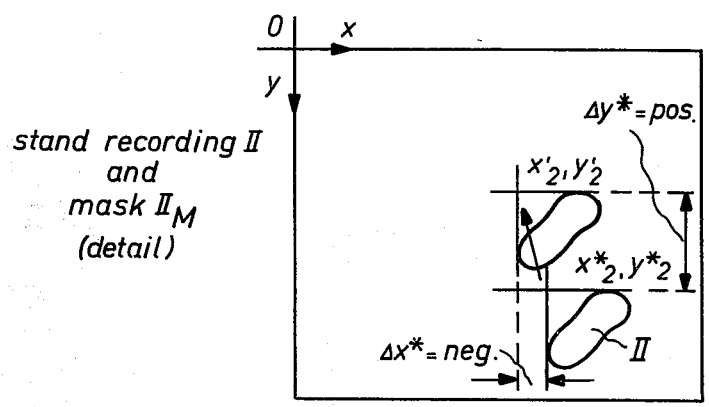

FIGS. 1a, 1b and 1c illustrate schematically the patterns which are required to execute the image pattern combination as was described in U.S. Pat. No. 3,904,816. In that system, it is necessary that the images be formed in their final format scale and precisely in registration relative to each other. Such patterns are usually designated in the reproduction technique as "Stand". According to the method of the prior art, these patterns were produced in a separate operation from the initial originals which did not exist in the required format scale and register. These patterns then were scanned and stored digitally and the image combination was accomplished with the data thus obtained form storage. In contrast with these prior art methods in the present invention, the image combination is accomplished with the image data scanned from the originals and stored in the memories.

In order to determine the corrective parameters, intermediate recordings of both images are produced directly from the original data by way of a conventional recording instrument and from this data the mask is produced. A special feature of the present method is that these intermediate recordings show format and scale of the definitive reproductions and are oriented with regard to a common register system. Because the properties of the intermediate recording produced by the present invention are common as the second originals of the prior art method referred to above which are designated as "Stand" hereinafter the intermediate records will be designated as "Stand Recording".

FIGS. 1a and 1b schematically illustrate stand recordings of an image I into which another image II is to be reproduced. Changes as to scale, changes of the screen widths between the original and stand recordings are carried out where necessary in an operational process not shown in detail with electronic equipment using methods from the prior art from the data inventory of the scanned original image. For this purpose, the method described in U.S. Pat. application Ser. No. 667,504, now U.S. Pat. No. 4,075,663, and/or German Patent No. 2,541,138 can be used. It would also be possible to use special scanning methods as described in U.S. Patent application Ser. No. 842,506, now U.S. Pat. No. 4,127,870, relating to methods for the change of image-dot-like disintegration of half tone images when changing from reproduction to recording or by using the techniques described in U.S. Pat. application Ser. No. 842,286, method for obtaining digital recording data for screened color separations. In scanning the originals it is possible to select at the scanning instrument, the scanning frequency and the feed so that scale and register system will match for the image combination. Such scanning instruments are known in the prior art and need not be discussed in detail herein. The frequency requirements for the scanning result from the size of the original and the screen width of the final reproduction.

In FIGS. 1a and 1b, the detail II represented in FIG. 1b is to be copied into image I. For the comprehension of the method described below, the coordinates x and y on the stand recordings according to FIGS. 1a and 1b are referenced from the upper left corner at zero point with +x being toward the right and +y being toward the bottom. Detail II which in the stand recording of the image II has the position coordinates of $x_2$, $y_2$ is to be copied into image I with the modified coordinates $x_1$, $y_1$. As is seen from FIG. 1b, detail II is located in a wrong location. So as to move it to the desired position as desired so it can be placed in image I, it must be shifted in the +x and +y directions toward $x'_2$ and $y'_2$. In the examples of FIGS. 1a and 1b, this shift is in both cases in the direction of plus coordinates of x and y.

Another example, is illustrated in the FIGS. 1a and 1c where detail II in image II is located at a different location that is at $x^*_2$, $y^*_2$. So as to bring it into the position $x_1$, $y_1$ of FIG. 1a, which is indicated in FIG. 1c into the position $x'_2$, $y'_2$, a shift in the minus direction of the x-y coordinates is necessary which is to say that $\Delta x$ and $\Delta y$ have negative values.

In order to copy detail II into image I, a mask is produced from the stand recording II of FIG. 1b or 1c which frames detail II in its contour and the coordinates $x_2$, $y_2$ or $x^*_2$, $y^*_2$ are determined. The mask thus obtained is not again represented as a separate figure since its structure corresponds with the schematic presentation of FIGS. 1b and/or 1c having the detail coordinates $x_2$, $y_2$ and/or $x^*_2$, $y^*_2$. The mask $II_M$ is then scanned in a manner known in the prior art electro-optically and the scanning data is stored as described in U.S. Pat. No. 3,904,816.

Figure 2:
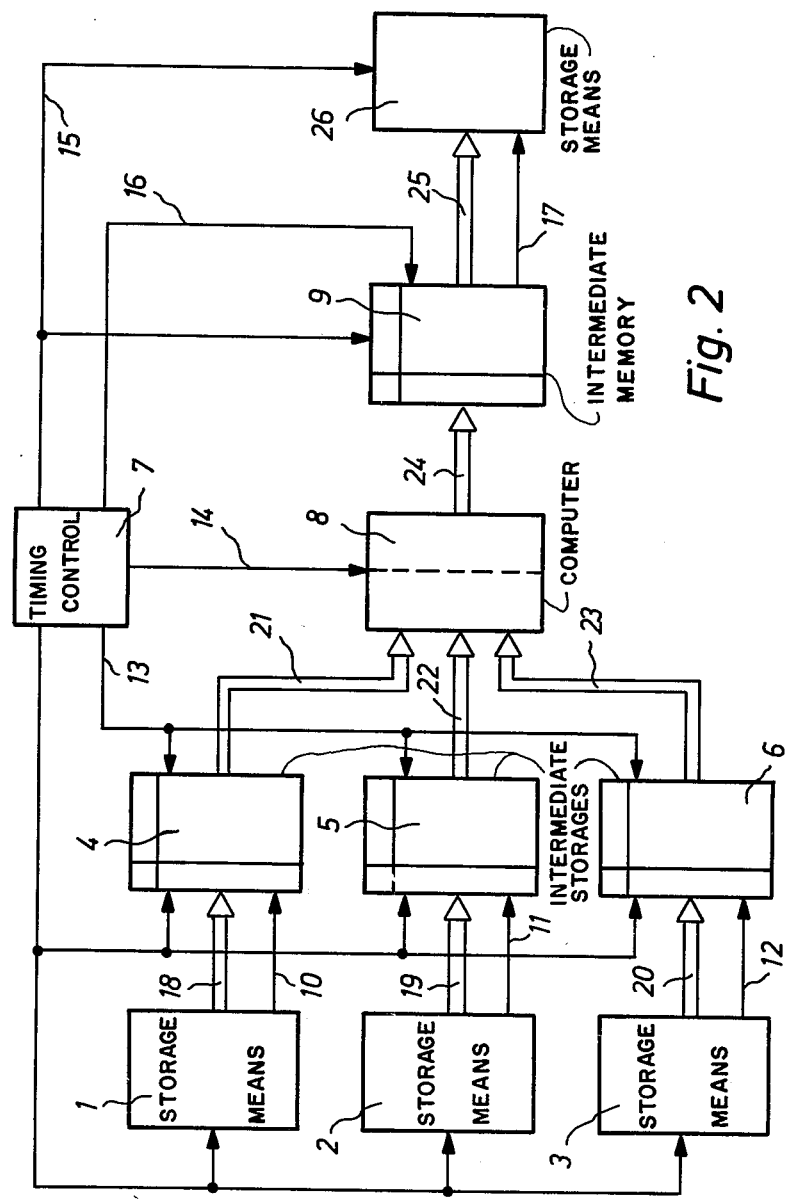
FIG. 2 is a schematic circuit diagram of an apparatus of the invention.

FIG. 2 is a block diagram of an installation for the embodiment of the image combination which corresponds substantially with FIG. 1 of U.S. Pat. No. 3,904,816. Several data input and output means are provided each of which comprise a record storage means 1-3 and intermediate storage means 4-6 which are connected to a timing control mechanism 7. Also, a computing means 8 as well as an intermediate memory 9 and an additional record storage means 26 are provided which are likewise connected to the timing control mechanism 7. As contrasted with U.S. Pat. No. 3,904,816, record storage means are used in the present invention since they offer increased storage capacity. However, magnetic tape or other recording means may be used just as well if access time and the capacity suffice for the recording of the image signals.

The image data fed into the recording storage means 1-3 are stored in the form of signal values consisting of 6-8 bits per image dot on corresponding tracks. Timing data connected to the original image dot location of the memory value is stored on an additional track. The data are stored in recording blocks each corresponding to one line such that in each case one line of the stand recording is housed on one sector of the record or plate. With the image combination, one line is read out in each case from all three record storage means and transferred into the buffer memories 4-6 which are constructed precisely to accept the capacity of the longest line which will occur. The image dot timing arrive by conduits 10, 11 and 12 at the intermediate memories 4, 5 and 6.

Starting impulses are produced by the timing control mechanism 7 and supplied on conduit 13 to initiate signals from the buffer memories 4-6. Line starting impulses are emitted for storing the data in the computer mechanism 8 by way of conduit 14 and line starting impulses for storing the combined data are transmitted into the buffer memory 9 by conduit 14 and into the record storage means 26 through conduit 15. A conduit 16 extends from the timing control 7 to the buffer memory 9 to cause it to transmit its data into the record storage means 26.

The actual image data are transmitted by data busses 18, 19 and 20 from the first record storage means 1-3 into the intermediate storage means 4-6 through data busses 21, 22 and 23 and from there into the computer mechanism 8 and by way of data bus 24 from the computer mechanism 8 to the intermediate buffer memory 9 and by data bus 25 from the memory 9 to the record storage memory 26.

If it is assumed that the data of the image originals I and II are filed in the memories 1 and 2 and the data for the mask are filed in memory 3 and the memory and storage units 9 and 26 are utilized as dispensing unit for the combined image which is desired.

Figure 3:
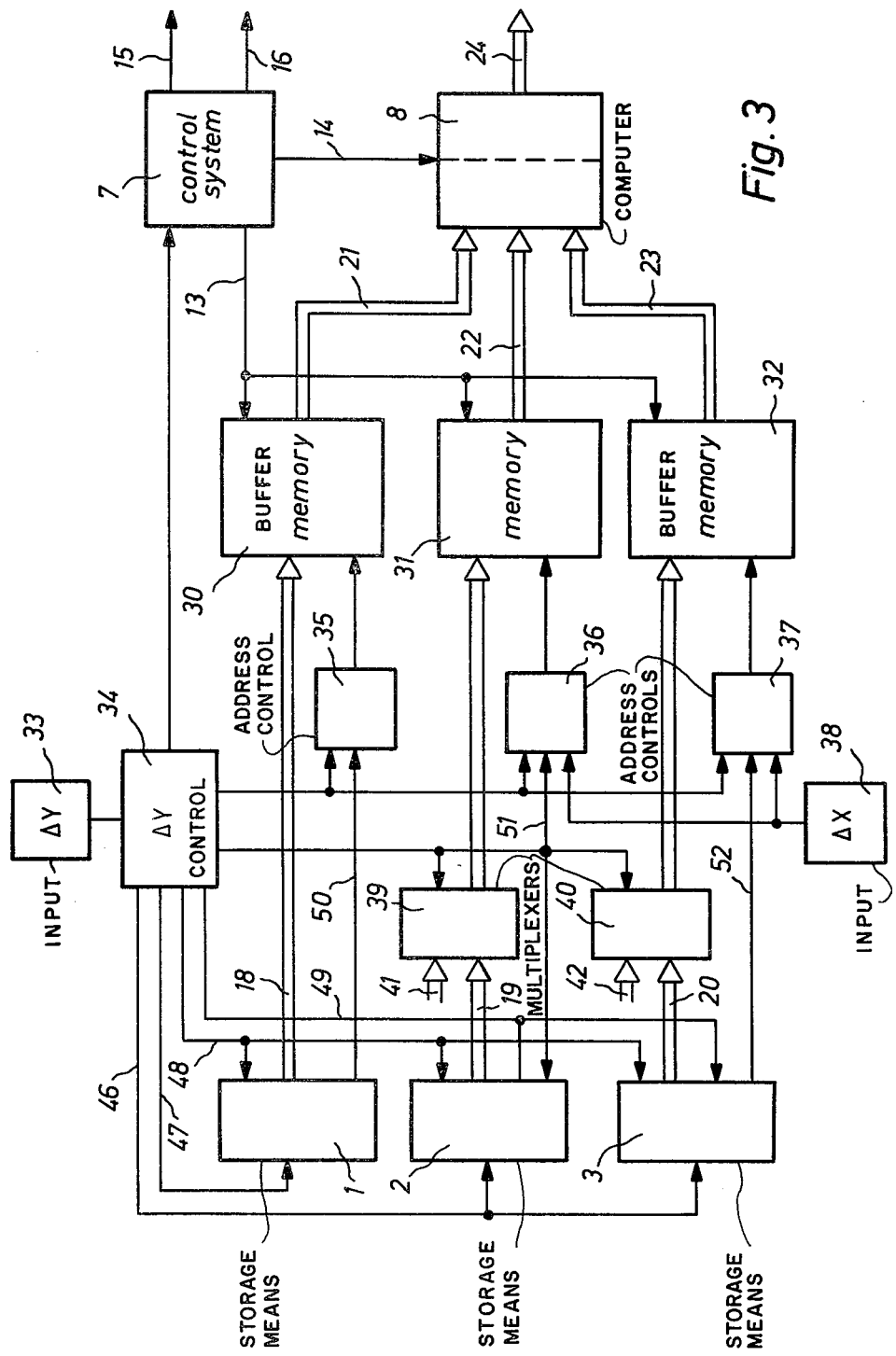
FIG. 3 illustrates a modified apparatus of the circuit of FIG. 2.

FIG. 3 comprises an expanded block circuit diagram with a construction of assemblies modified from U.S. Pat. No. 3,904,816 so as to embody the present invention. For better comprehension of FIG. 3, the various steps of the method will be described.

Initially, the image originals I and II, the stand recordings illustrated in FIGS. 1a and 1b are recorded and placed in intermediate storage. In a subsequent step, according to this method, the mask is produced and scanned manually. In the data inventory of the image to be copied in the image data located outside the mask are eliminated. In a subsequent operation, the stand recordings are superimposed on a light box with graph paper relating to image I and image II and the stand recording of image II is so shifted that the detail II reaches the right location in image II. The $\Delta x$ and/or $\Delta y$ coordinates are determined by measuring which result when detail II is shifted according to FIG. 1b to the position of $x'_2$, $y'_2$. These coordinates are used to combine the previously masked data of the image to be copied into the other Figure at the right location within the data inventory of image I. The consideration of the $\Delta$ coordinates as illustrated in FIG. 3 comprises an additional feature not known in U.S. Pat. No. 3,904,816.

So as to supply the $\Delta y$ and $\Delta x$ coordinates an address control system for supplying the data into the buffer memories 4, 5 and 6 are provided. A Δy input unit 33 is connected to a Δy control 34 which in turn is connected to the address control systems 35, 36 and 37 for image I, image II and mask II$_M$. The memories 4, 5 and 6 of FIG. 2 are illustrated in a manner such that the address control systems were integrated as address counters in the memories. In FIG. 3 apparatus, the address control systems are arranged externally in the form of counters 35, 36 and 37 and are connected to the memories 30, 31 and 32 which correspond to memories 4, 5 and 6 of FIG. 2.

In addition, a Δx input 38 is provided which directly supplies an output to the address control 36 and 37 of memories 31 and 32. In addition, data multiplexer 39 and 40 are interconnected in the data busses 19 and 20 of FIG. 2 between the record storage means 2 and 3 and the intermediate storage means 5 and 6, respectively. The data multiplexer 39 and 40 also receive inputs by data buss inputs 41 and 42 which will be described in greater detail hereafter.

Timing conduits 46 and 47 originating from Δy control 34 are connected to the record storage means 1, 2 and 3 as shown.

If it be assumed that the storage units 1 and 2 contain the image data of image I and image II and unit 3 contains the mask data, and that in a separate operation the stand records of image I, image II and the mask are produced. Additionally, it is assumed that Δx and Δy values of the shifting of detail II in image I have been determined. The consideration of the Δx and Δy coordinate values then takes place as follows according to FIG. 3.

The address control units 35, 36 and 37 comprise address counters which count up by a so-called record memory timing on conduits 50, 51 and 52. The address control installations 36 and 37 each include an adder which adds the counted address to the preset Δx value thus causing a shifting by corresponding storage into the buffer memories 31 and 32.

The Δy values are fed from the input unit 33 and two different cases are possible:

I. The Δy values are negative

Prior to the issuance of the first line requisition timing from the Δy control to the three record storage means 1, 2 and 3 on conduits 46 and 47, the address y$_o$=Δy is placed by means of conduit 49 into the record storage means 2 and 3 and transferred with the timing control to conduit 48 of the record storage means control. Only then are line requisition timings transmitted simultaneously to the record storage means 1, 2 and 3 and data are taken into the buffer memories 30, 31 and 32. The record storage unit 1 starts since it receives address 0 with the sector address 0 and the record storage units 2 and 3 commence with the sectors according to /Δy/ so that the negative shifting is accomplished. The record memories 2 and 3 will terminate the readout prematurely, since they commenced at the address /Δy/ and not at address 0. As soon as the data of the last address corresponding to the last line in image II and to the mask II$_M$ are read out, the line requisition timing to the record memories 2 and 3 are blocked and by way of multiplexers 39 and 40 via the inputs 41 and 42, a fixed bit combination is applied as a control order for the computer unit hereinafter called the mask arithmetic to the input of the buffer memories 31 and 32 and read into the memories.

2. Δy is Positive

Shifting is accomplished by reading out first only the lines corresponding to Δy from the record memory I for image I and transferring this data into the buffer memory 30 for image I. Only fixed specific mask control data are read into the buffer memories for image II and for mask II$_M$ (31 and 32) by way of inputs 41 and 42 through the multiplexers 39 and 40. Then the read out of the data from the record memories 2 and 3 start from address 0 on while the sector address of the record memory for image I continues to be counted from /Δy/.

For additional understanding of the invention, the block diagram of FIG. 3 is illustrated in greater detail. The circuit block diagram of FIG. 3 is to be considered with additional detail circuit diagrams illustrated in the other Figures which show in detail the controls of the processes as they are activated. For example, FIG. 4 illustrates in addition to the principal component groups of FIG. 3, the individual points of intersection in the conduit connections which occur in higher numbered Figures.

Figure 5:
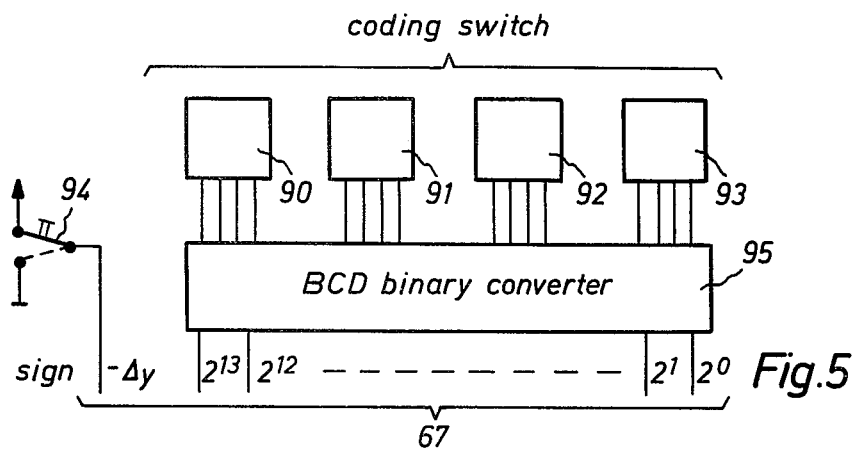
FIG. 5 is a block diagram for feeding in of the shifting information.

FIG. 5 illustrates the Δy input 33 which accomplishes a shifting of the signals from the stand recording II and mask II$_M$ can be fed in a vertical direction. The shifting is fed in with coding switches 90–93, line by line manually as decimal numbers. With the use of four coding switches 90–93, it is possible to set shiftings from 0 to 9999 lines. The direction of the shifting is determined by a switch 94 with the binary number 0 being associated with a positive shifting and binary 1 with a negative shifting. This signal is available on bus 67. The four coding switches furnished in each case depending upon the number to which they are set signals in the BCD code by way of output conduits that are supplied as inputs to the BCD converter 95 where they are converted into a binary code available at terminals $2^0$ to $2^{13}$ of the bus 67.

BCD binary converters are known in the prior art and describe for example in books such as TTL Integrated Circuits Condensed Catalog TI GmbH 805 Freising, dated April, 1971.

Figure 4:
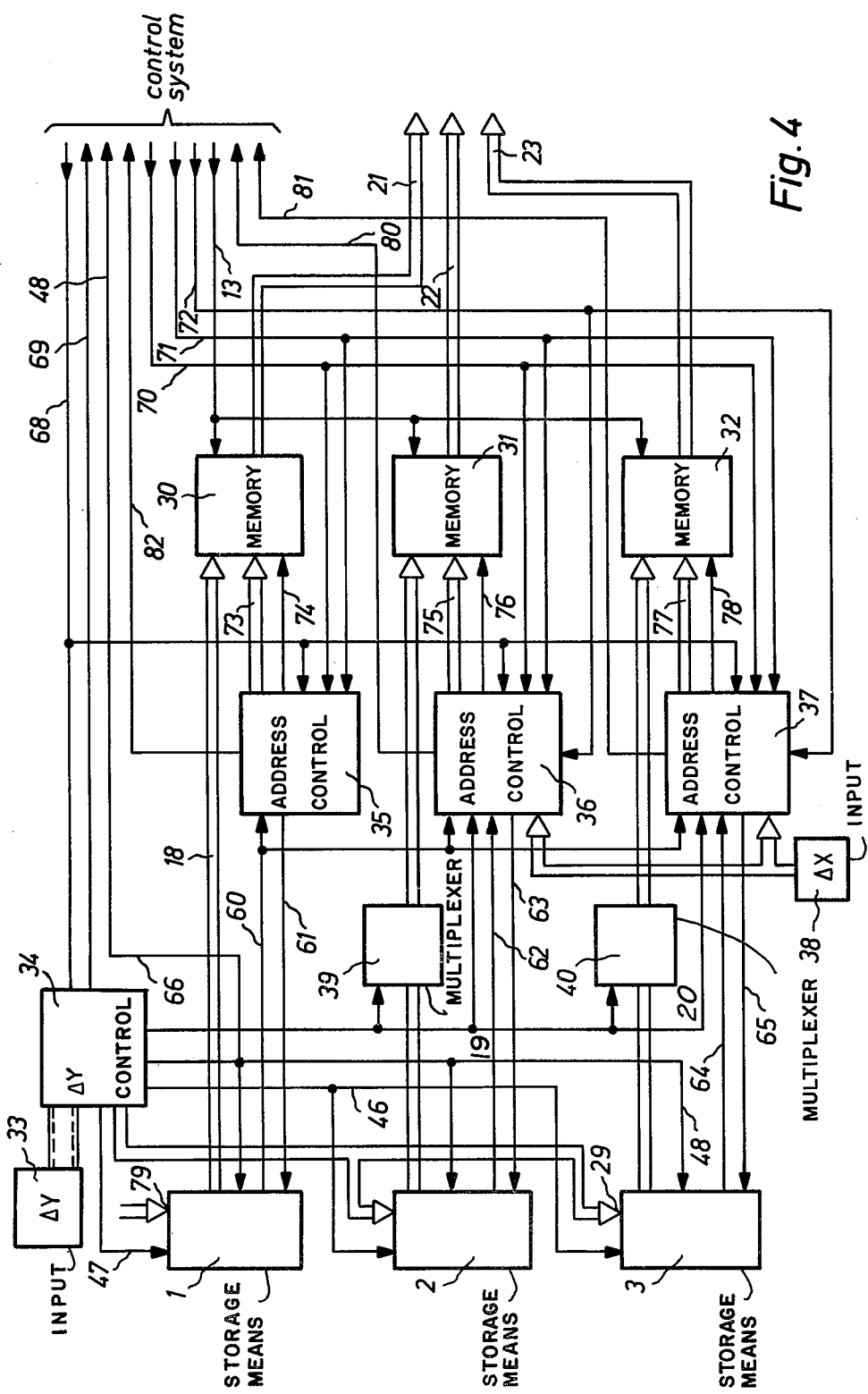
FIG. 4 is a detailed block circuit diagram of the apparatus showing the interconnections of additional Figures.
Figure 6:
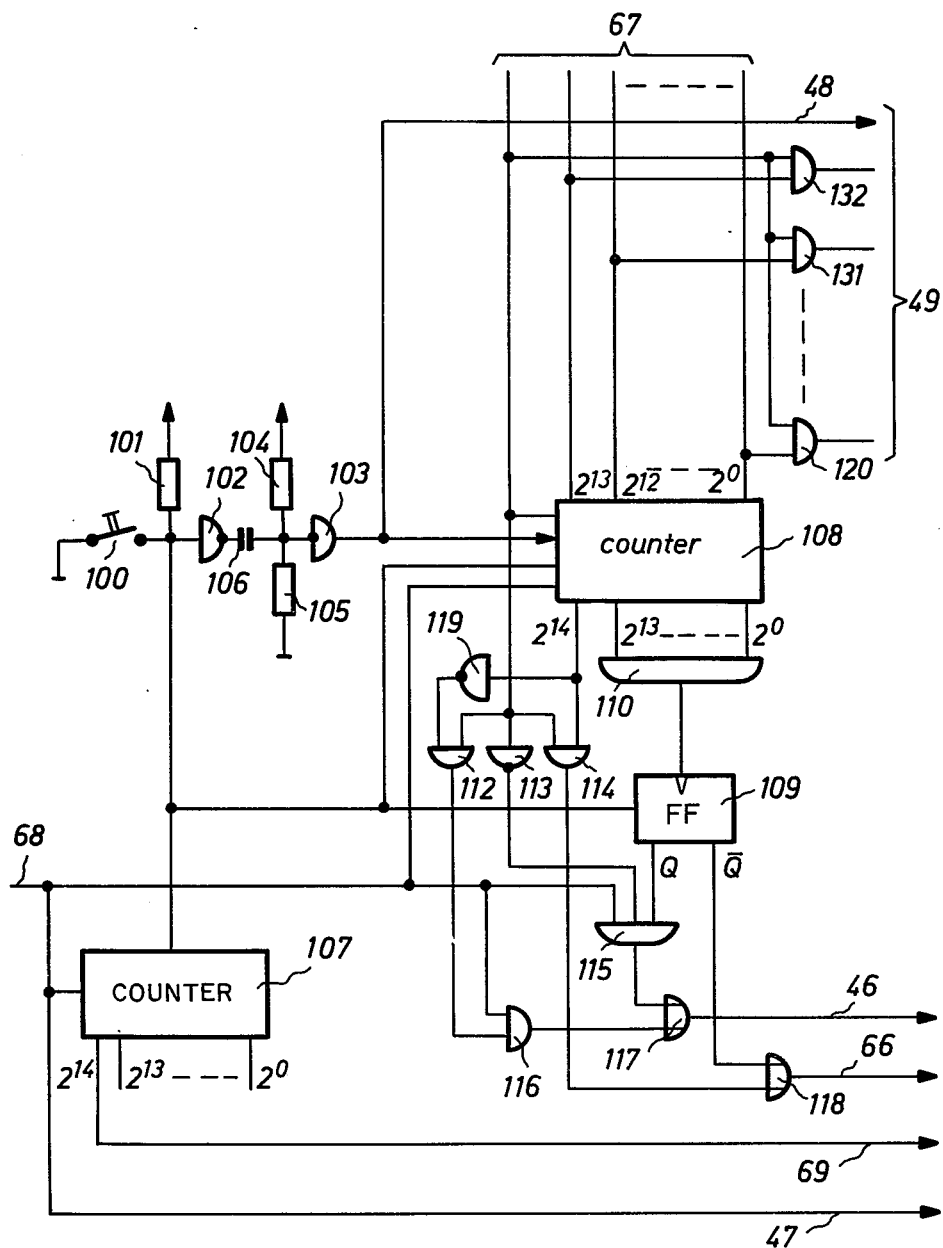
FIG. 6 is a block diagram of a shifting circuit.

FIG. 6 illustrates the Δy control 34 shown in FIG. 4. A starter key 100 supplies a signal to the counters 107 and 108 and a flip-flop 109 to set them to zero. Time delay is accomplished with a time delay member consisting of inverters 102 and 103, resistors 104 and 105 and a capacitor 106 and the counter 108 counts up to the preset Δy value while at the same time the timing control mechanism is given such information by way of a conduit 48 that a processing cycle is to be started.

Also, the signal on conduit 48 is fed to the recording memories 1, 2 and 3 where it records the address data located at the address inputs 79 and 29 to the memory controls. The address 0 always is placed at the address input 79 of the control of the record memory. One address is located at the address inputs of the record memories 2 and 3 which if it has a positive sign amounts to Δy and with negative sign of Δy it equals the amount of Δy. The address shifting is accomplished by considering the sign of Δy and by means of the AND gates 120 through 132.

In response to the starting signal on conduit 48 to the timing control mechanism 7 it transmits a line starting signal on conduit 68. The line starting signal is transmitted by way of the conduit 47 to the record memory 1 and line starting signals for the control of the record memories 2 and 3 are derived from this signal such that they are a function of the sign of the y shifting.

Under a positive y shift, the output signal of the inverter 113 is a logic 1 and prepares the AND gate 115. However, a zero exists at the Q outlet of the flip-flop 109 so that for the time being no line starting signal occurs on conduit 46. Because of additional line starting signals on conduit 68, the count reading of the counter 108 is counted down which operates through the sign conduit of the bus 67 to provide the down count mode. When the meter of counter 108 has reached zero, a zero will occur at all outputs $2^0$ to $2^{14}$ and a logic 1 will occur at the multiple gate 110 output and the flip-flop 109 will be set so that from this instant, due to the coincidence at the AND gate 115, the line starting impulses travel through conduit 68 and gates 115 and 117 to conduit 46 and to the record memories 2 and 3 so that they will commence to read out of storage sectors. As long as the flip-flop 109 has not yet been set to its output, a logic 1 will exist at its $\overline{Q}$ outlet which is supplied to conduit 66 through the OR gate 118 and represents a special control signal which causes reading in of a certain mask order into the buffer memories 31 and 32 in a manner which will be described later.

When negative y shifting occurs, the sign conductor of the conductor bus 67 causes the counter 108 to be switched to the function up-count mode, also it causes by way of inverter 113 the blocking of the AND gate 115 and the preparing of both AND gates 112 and 114. As long as the counter 108 has not yet been counted up to a value of $2^{14}$ by renewed line starting signals from conduit 68, the output $2^{14}$ blocks the gate 114 with a logic zero and after inversion by inverter 119 coincidence results at the AND gate 112. The output signal of gate 112 connects the line start all the way through from conduit 68 at the AND gate 116 and such signal is then carried by way of the OR gate 117 to conduit 46 and, thus, to the record memories 2 and 3 and they will then in each case read out per line start one sector and hence an entire line.

However, as soon as the counter 108 has reached the value of $2^{14}$, the line start signals are blocked by the output signal $2^{14}$ of counter 108 by way of inverter 119 and gates 112 and 116. On the other hand, this output of the counter along with the sign signal on the conduit cluster 67, causes at the AND 114 a signal which reaches by way of the OR gate 118, the control conduit 66 and it again causes the recording of a certain mask order into the buffer memories 31 and 32.

The line start signals on conduit 68 up-count the counter 107 which originally is set to zero. The counter counts the entire number of image lines which were set into this particular embodiment with $2^{14}$. Once the up-counted counter 107 has reached the meter value of $2^{14}$, the output to the $2^{14}$ produces a logic of one which by way of the conduit 69 is supplied to the timing control 7 and indicates the end of the number of lines so that the timing control mechanism concludes the entire step.

Figure 7:
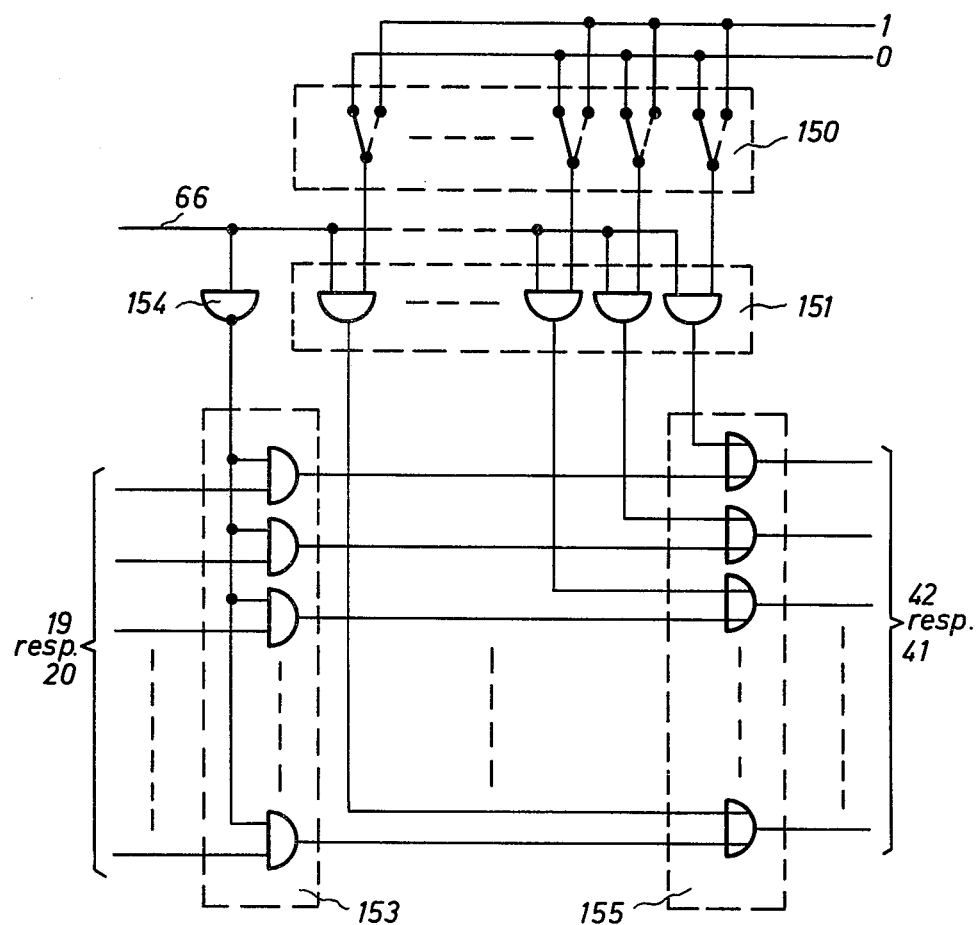
FIG. 7 is a block diagram illustrating the switching installation for the image data.

The circuit illustrated in FIG. 7 comprises a switching installation for the image data which are inserted in each case between the record memory 2 and the buffer memory 31 respectively between the record memory 3 and the buffer memory 32.

The image data comprises a number of bits per image dot for example, 6 to 8 bits which may contain the grey values in a certain code, for example, the PCM code and if applicable, a few other control orders. The incoming data conduits 19 respectively 20 illustrated in FIG. 4, are connected to a number of AND gates 153 and the data is then conducted by way of a number of OR gates 155 to the output conduits 42 respectively 41, and further to the buffer memory data inputs of the buffer memories 31 and 32. In cases where data is to be transferred from the record memories into the buffer memories, a logical 0 arrives as control signal from the y control in FIG. 6 by way of conduit 66 and is then inverted in an inverter 154 and connects the AND gates 153 into the conducting mode so that the input data at conduits 19 respectively 20 can reach the outputs 42 respectively 41.

In the event, that the record memory 1 does not in fact receive line start impulses by way of conduit 47, but line start impulses for the record memories 2 and 3 are blocked by way of conduit 46 by a logical linking of the $\Delta y$ control in FIG. 6, a logic 1 appears on conduit 66 of the $\Delta y$ control so that at the row of the AND gates 151 illustrated in FIG. 7, the path will be opened for logic signals which are static actuating the switch row 150. The combination of the logic signals thus set represents a specific mask order. It arrives by way of the AND gates 151, the OR gates 155 and conduits 42 respectively 41 at the buffer memories 31 respectively 32. Simultaneously, the AND gates 153 are blocked due to the signal inverted at the output of the inverter 154 by the incoming signal on conduit 66.

Figure 8:
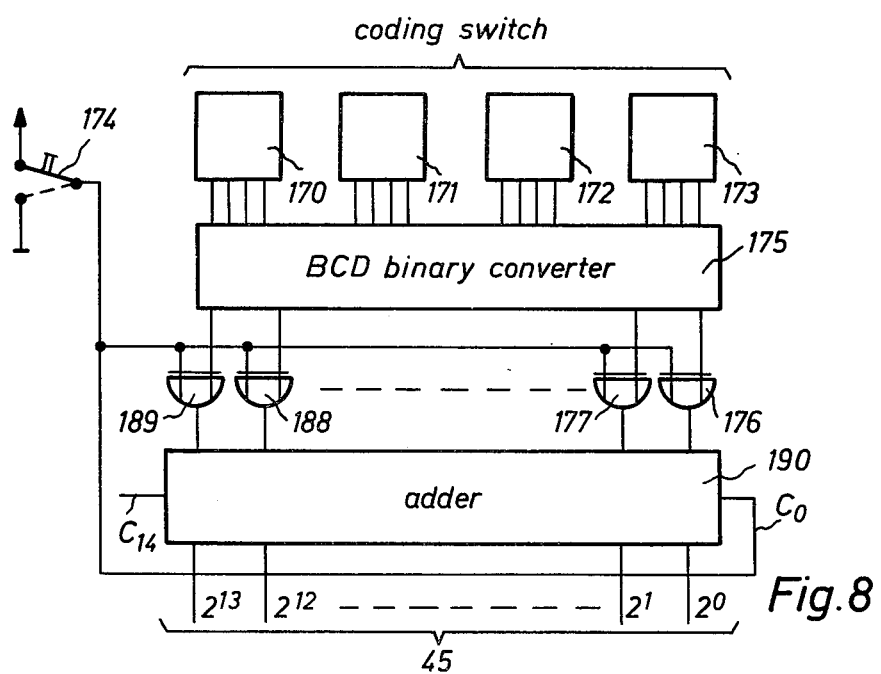
FIG. 8 is a block diagram of an example for a circuit for feeding in of the x values.

FIG. 8 illustrates the $\Delta x$ input 38. Similarly to the $\Delta y$ input, the shifting difference is set by coding switches 170 to 173 as a decimal number and converted into a BCD binary converter 175 into a binary number. The direction of shifting is again programmed with a switch 174. A negative shifting corresponds to a logic 1 and a positive shifting corresponds to the logic 0.

The so-called two complement is formed in Exclusive-OR gates 176 through 189 and in a full adder 190 in case of a negative difference. This is accomplished because with negative signs the logic 1 of the switch 174 inverts through an exclusive OR linking of the gates 176 to 189 the output signals of the BCD binary converter, and in the adder 190 by way of conduit $C_o$ a 1 is added. The results then appear at the conduit bus 45.

In contrast with customary two complement formers of the prior art, the adder 190 does not contain a stage for a possible carry out bit and a stage for a sign bit. Both of these stages may be dispenses with in the invention because only the outputs $2^0$ to $2^{13}$ are to be further evaluated. The reasons for this are explained with the use of tables of FIG. 11 which illustrates two specific examples.

With a positive difference, the sign bit at the switch output of the switch 174 is a logic 0. The output signals of the BCD converter 175 pass unchanged through the exclusive OR gates 176 through 189 and the full adder 190 and are present at the conduits 45 which lead to the address controls 36 and 37.

Figure 9:
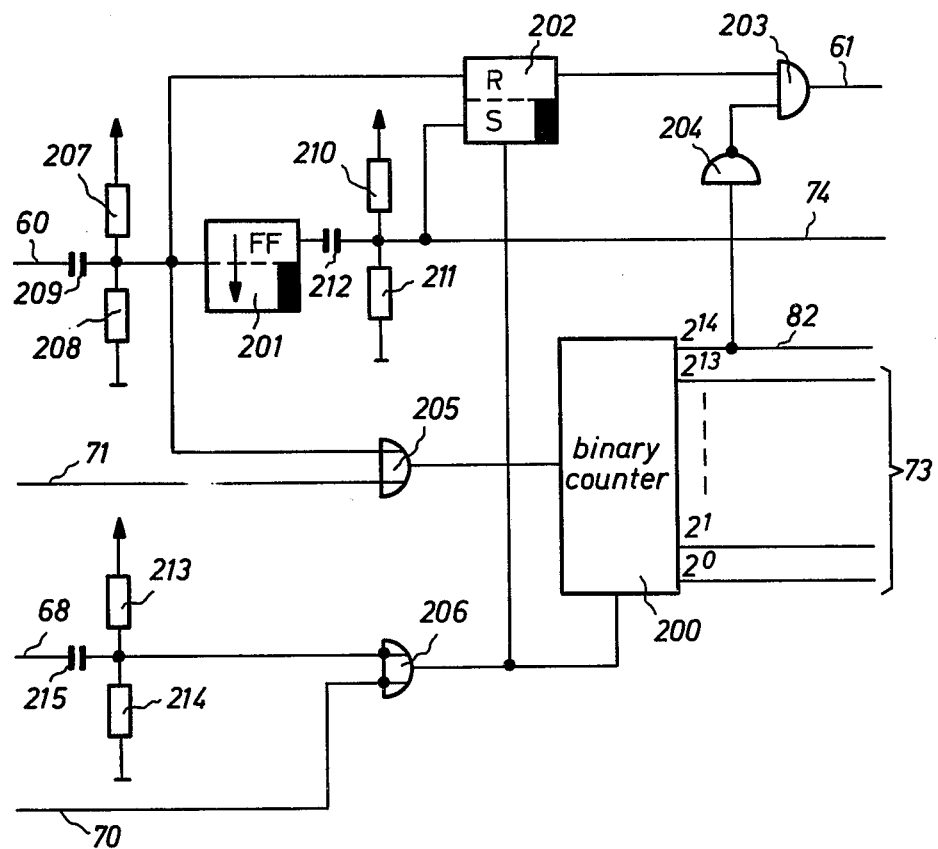
FIG. 9 is a block diagram of the address control.

FIG. 9 illustrates the address control forming the memory addresses for the buffer memory 30 and for controlling the data traffic for one image line each between the control of the record memory 1 and the buffer memory 30. FIG. 9 includes an address counter 200, a mono-flop 201, and RS flip-flop 202 and some simple logic linkings.

After the entire system is turned on, the address counter 200 and the RS flip-flop 202 are set to zero at the start, and after each line from the record memory has recorded into the buffer memory, the setting to zero of the counter 200 and the flip-flop 202 is accomplished via conduit 70 and an OR gate 206 by the timing control mechanism 7. The setting of the counter and of the RS flip-flop to zero is accomplished additionally in each case with the line start signal which also arrives from the control 7 through conduit 68 and is differentiated in a differentiating member comprising the resistors 213 and 214 and a capacitor 215. The signal has a transition which is used to generate an impulse that arrives by way of gate 206 at the zero reset input to the counter 200.

Simultaneously, these line start signal arrives on conduit 68 for the control of the record memory 1 and requisitions the first data word of a record or a disk sector. After a predetermined time which depends on how long it will take the scanning head of the disk or record to reach the proper position on the sector, the record memory control produces a data word at its output on conduit 118 and simultaneously and issue signal on conduit 60. The switching transition of this signal on conduit 60 is differentiated in the differentiator comprising the resistors 207 and 208 and a capacitor 209 into a short impulse and it is supplied to the mono-flop 201 whose output is fed to an additional differentiator comprising the resistors 210 and 211 and the capacitor 212 whereby the rear switching transition of the mono-flop impulses differentiated and the impulse delayed in time relative to the input impulse at the mono-flop 201. The pulse causes by way of conduit 74 the recording of the data on the conduits 18 into the buffer memory 30. The output impulse at the output of the differentiator comprising resistors 210 and 211 and the capacitor 212 sets the RS flip-flop 202 and the output of the flip-flop 202 is transmitted by way of the AND gate 203 to conduit 61 and this signal represents a new data requisitioning signal for an additional data word for the control of the record memory 1. A logic 1 is placed at the other input of the AND gate at that time and said 1 represents the inverted signal of the output $2^{14}$ of the counter 200.

Counter 200 receives the same impulse which is received at mono-flop 201 so that it will switch the counter from 0 to 1. The data requisitioning signal generated on conduit 61 causes the record memory 1 to issue an additional data word on conduit 18 and an associated timing signal on the signal conduit 60. The signal on conduit 60 is again differentiated in the differentiator comprising the resistors 207 and 208 and the capacitor 209 and resets at the input R of the flip-flop 202 the output signal so that now the data requisitioning signal is erased by way of the AND gate 203 and conduit 61. At the same time, the mono-flop 201 output signal has its rear switching transition differentiated, the RS flip-flop 202 is again set and a new data requisitioning signal is generated and the data on conduit 18 are transferred through the recording signal on conduit 74 into the buffer memory 30 and finally the counter 200 will count up from 1 to 2.

This cycle will repeat until the counter 200 has reached the counter reading of $2^{14}$.

When the output signal is on output $2^{14}$, the inverter 204 will invert it into a zero and the AND gate 203 will be blocked so that no new data requisitioning signals arrive by way of conduit 61 at the control of the record memory. The line end reached thereby is announced to the timing control mechanism by way of conduit 82. It interrogates the conduits 80 and 81 whether the line end also is present for the address controls 36 and 37. If this is the case, the control 7 commences with the time wise simultaneously read-out of the three buffer memories 30, 31 and 32 and the output data will be fed to the computer 8 (mask logic unit).

The readout is done in such a manner that at the start the counter 200 is set to zero as described above then a read order is issued by way of conduit 13 to all three buffer memories.

A counting time sequence then follows which reaches from the control 7 by way of conduit 71 and the OR gate 205, the counting input of the counter 200 and upcounts it by one step. As a result, the next address is located at the buffer memory 30 and the next data word can be read out. This operation is repeated until all memory words have been read out which again is announced by the counter 200 by way of its output $2^{14}$ and conduit 82. Then the control 7 can emit a new line starting signal by way of conduit 68 thus bringing about a new line cycle.

The processing of the data in the computer 8 (mask logic unit) which are read out of the three buffer memories 30 to 32 on conduits 21, 22 and 23 and the subsequent storing of the processed data by way of the buffer memory 9 into the record memory 26 and the associated control functions of the rhythm control 7 are not described in detail herein as such matter is known in the prior art as for example in U.S. Pat. No. 3,904,816 which is the U.S. equivalent of German Patent No. 2,137,676. The mask arithmetic referred to on page 11 comprises a computer unit 8 illustrated in FIG. 2 or the computer unit 24 illustrated in FIG. 3 both of which are illustrated in U.S. Pat. No. 3,904,816.

FIG. 10 illustrates the address control which can be used in the same manner for the control of both the record memory 2 with the buffer memory 36 and the record memory 3 with the buffer memory 37. Part of this control including the counter 230 the RS flip-flop 233, mono-flop 232 and some of the gates have identical functions as the components of the address control 35 described relative to FIG. 9 so reference may be made to the description of FIG. 9 for such components. Additionally, there is an adding means 231 AND gates 241 to 254, AND gates 238 and 239 and OR gate 240.

The adding means 231 accomplishes the task of adding to the buffer memory address which is brought about by counting the data signals arriving on conduits 62 and 64 respectively from the controls of the record memories 2 and 3, respectively, the value of the x-shifting as it exists at the output of the $\Delta x$ setting 38 and as it is fed by way of conduit 45 to the address control 36 respectively 37. In this manner, the new buffer memory address is created at the output of the adding means 231 and appears on conduits 75 respectively 77 with results that all data are read into the buffer memory in an address shifted manner which illustrates the x-shifting concept of the invention.

No address shifting must take place during the later read out of all buffer memories 31, 30, and 32. To assure this the AND gates 241 through 254 which are controlled by a signal on conduit 72 are blocked and nothing but zeros are placed at the B inputs of the adding means 231 so that at the output terminals $O2^0$ to $O2^{13}$ the precise counter address of $A2^0$ to $A2^{13}$ is placed.

As has been described above with the presence of the adjusted Y shiftings, it may happen that in fact data are transmitted from the record memory 1 into the buffer memory 30 but that for several lines no transfer of data shall take place from the record memories 2 and/or 3 to the buffer memories 31 and/or 32. However, for these later cases, the buffer memories 31 and/or 32 shall be filled by way of the data commutators 39 and 40 with fixed set mask orders. The controls for these operations is effected by the address controls 36 and 37 respectively. Since no data signal appears in these cases on conduits 62 and/or 64 which could produce the buffer memory insertion timing on the conduit 76 and/or 78, the data signal is guided by the control of the record memory 1 on conduit 60 to the address control 36 and/or 37. When coincidence in the AND gate 239 occurs with the identification signal which in this case arrives from the $\Delta y$ control by way of conduit 66 the mono-flop 232 is approached by way of the OR gate 240 and the differentiating means consisting of the resistors 258 and 259 and capacitor 260 and the posterior flank of the mono-flop output will be differentiated by means of the components 255 through 257 into an impulse thereby representing the buffer memory recording signal on conduits 76 and/or 78 which causes in the memories 31 and/or 32 the recording of the mask code word.

At the same time, the RS flip-flop 233 will be set or reset but this is not significant in this case since the identification signal on line 66 which has been inverted at the output of the inverter 238 blocks the AND gate 234 for the entire time thus preventing data requisition signals from reaching the record memories 2 and/or 3.

Only when the identification signal disappears on conduit 66 which means a logic zero exists will the data signal of the record memory 1 (conduit 60) is blocked in the AND gate 239 and the AND 234 will be opened so that then a control can be executed for the data traffic between the record memories 2 and/or 3 and the buffer memories 31 and/or 32.

Table 11 illustrates two examples for address conversion as they are accomplished in the address controls 36 and/or 37.

Table 11 for purposes of clarity illustrates a calculation which is used for exemplatary purposes with a very low number of image dots of only $2^4$ per line instead of $2^{13}$ image dots per line which would exist in a practical embodiment.

There are two identical tables 11a to the left of the Figure and each list the sixteen possible addresses corresponding to the number of image dots produced by a simple counting in a binary counter. A reserve bit which is always zero and represents only one adding phase and the sign bit which is always a zero are added because by selection of the coordinate point in the upper left hand corner of the stand recordings only positive x values are possible. The reserve bit is identified by "R".

The upper row of FIGS. 11a, 11b and 11c in FIG. 11, illustrate a positive address shifting where an x= +3. In table 11b, the numeral +3 is coded into a binary number and a reserve bit.

The values illustrated in table 11c are in each case the arithmetic sum of the values from tables 11a and 11b. The sum total values in table 11c vary from the top of +3 to the bottom of +18. The buffer memory generally will have however only input addresses of 0-15. This is why the reserve bit place and the sign place are disregarded and not executed in the circuits with the $\Delta x$ input 38 and the adding means in the address controls 36 and 37 from the circuit viewpoint. A comparison of tables 11a and 11c illustrate that the image dot data of the image dot 0 to 12 are filed under the buffer memory address 3-15 and the image dots 13, 14 and 15 are filed under the buffer memory address 0, 1 and 2. This corresponds to a +3 shift with the last three image dots being moved outwardly to the right and inwardly again to the left.

Tables 11a, 11d and 11e at the bottom of FIG. 11 illustrate how this simple scheme also works with negative values of x. For this example, $\Delta x = -3$ is illustrated. In the table $-3$ is executed as a two complement. Here again, reserve and sign bits are recorded but need not be executed from a circuit point of view. Table 11e shows the sum total from tables 11a and the two complement value of $-3$ in table 11d. The first three values in the sum total table 11e actually are negative numerals in the dual complement and these are $-3$, $-2$ and $-1$. These numerals are inappropriate for the buffer memory. By elimination of the reserve and sign bits, however, appropriate address values result which precisely represent a negative address shifting of $-3$ image dots. The original image dots 3-15 of table 11a are stored under the memory address 0-12 and the image dots 0-2 are pushed outward to the left and reinserted into the address range from the right at address positions 13-15.

The coordinate shifting of the stand recordings II and II$_M$ according to the idea of the invention was achieved in the embodiment by performing during the recording of the image lines into the buffer memories 30, 31 and 32 and address conversion so that the data are stored in the buffer memories 31 and 32 have already been shifted by $\Delta x$ and $\Delta y$. The read out of the image lines from the buffer memories 30, 31 and 32 and the processing in the mask arithmetic is carried out in the example described synchronously relative to time and address.

After the shifting has been accomplished, it is also possible to insert an area with predetermined tonal value in place of the image contents of the image which is to be copied into the other Figure. Selecting the tonal value 0 comprises an erasure; however, colored areas, symbols or signets may also be inserted.

It is also within the scope of the invention to accomplish the coordinate shifting by transmitting the image line data address synchronously from the record memories 1, 2 and 3 into the buffer memories 30, 31 and 32 so that the data of the stand recordings II and II$_M$ still are unshifted in the buffer memories and wherein an address conversion is carried out during the time synchronous readout of the image data from the buffer memories 30, 31 and 32 whereby with the mask arithmetic the image line data format is shifted. The address computation and control for the address synchronous recording and address shifted readout of the image line data at the buffer memories is very similar to the apparatus described in detail relative to FIGS. 3 through 10 and their detail description relative to the circuit technique is not given. The determination of the $\Delta x$ and $\Delta y$ coordinates can be accomplished in a light box which is covered with graphic foil. Such foil may comprise graph paper which can be transparent or semitransparent, for example, and are well known in the art. The $\Delta x$ and $\Delta y$ coordinates may be measured with parallel displaceable linear means associated with transmitters of position. The $\Delta x$ and $\Delta y$ values may be determined with the use of parallel displaceable register rods on which intermediate recordings are attached and which position transmitters associated with the register rods.

Although the invention has been described with respect to preferred embodiments, it is not to be so limited as changes and modifications can be made which are within the full intended scope of the invention as defined by the appended claims.

We claim as our invention:

1. A method for the production of image combinations of a master wherein the image data of the images to be copied into each other are stored in digital memories, and a mask is produced from one of the images for superimposing and copying the images and said mask is scanned, comprising the steps of forming and storing intermediate recordings true to register and scale from first and second images to be combined, forming a mask signal from the second image to be inserted into the other image and forming said mask of a size of the second image to be copied, scanning the second image to be copied and storing the information; eliminating the image data located outside the mask, but within the data inventory of the second image to be copied under control of the mask signal; placing the masked intermediate second image recording on the intermediate recording of the first image into which it is to be copied, and shifting it into the proper position; measuring the shiftings in scanning direction and transversely to the scanning direction, that is in x and y direction to obtain measured $\Delta x$ and $\Delta y$ values; and combining the $\Delta x$ and $\Delta y$ values with the stored data of the first image with the stored second image data of the other image to form a total image.

2. The method as defined in claim 1, characterized by the fact that for determining of the $\Delta x$ and $\Delta y$ value adaptation crosses are exposed into the intermediate recordings.

3. The method as defined in claim 1 characterized in that the determination of the $\Delta x$ and $\Delta y$ coordinates is carried out in a light box covered with graphic foil.

4. The method as defined in claim 2 characterized by measuring the $\Delta x$ and $\Delta y$ coordinates with the use of parallel displaceable linear means which are associated with transmitters of positions.

5. The method as defined in claim 4 characterized by determining the $\Delta x$ and $\Delta y$ values with the use of parallel displaceable register rods on which the intermediate recordings are attached and position transmitters associated with the register rods.

6. The method as defined in claim 1 characterized by the fact that in case of positive shifting transversely to the scanning direction (y) the readout of the digital memories (1,2 and 3) with the image (II) to be shifted is started later by the time corresponding to the shifting ($\Delta y$).

7. The method as defined in claim 1 characterized by the fact that with a negative shifting transversely to the scanning direction ($-x$), the readout of the image to be shifted (II) from the digital memories (1, 2 and 3) takes place from an address corresponding to the shifting ($1-\Delta y/$).

8. The method as defined in claim 1 characterized by replacing the masked and shifted range of said second image by a predetermined tonal value.

9. The method as defined in claim 1 characterized by shifting in the scanning direction ($\Delta x$) by adding the shifting value ($\Delta x$) to the address of the memory in which the image to be shifted is stored.

10. The method as defined in claim 8 characterized that any carry out bit produced during the adding of the shifting value to the addresses in one of said digital memories and the sign bit are eliminated.

11. The method as defined in claim 8 characterized by effecting the adding of a shifting value to the memory addresses in the case of a negative shifting ($-y$) by use of two complements technique.

12. The system for the production of image combinations of a master wherein the image data of the images to be copied into each other are stored in digital memories, and a mask is produced for superimposing and copying images and said mask is scanned to produce mask signal, forming and storing intermediate recordings true to register and scale corresponding to the image to be copied i and corresponding to the picture in which a copy is to be placed, forming a mask of a size of the image to be copied, scanning image to be copied and storing the information; eliminating the image data located outside the mask, but within the data inventory of the image to be copied under control of the mask signal; placing the masked intermediate recording on the intermediate recording of the image into which it is to be copied, and shifting it into the proper position; measuring the shiftings in scanning direction and transversely to the scanning direction, that is in x and y direction to obtain measured $\Delta x$ and $\Delta y$ values; and combining the $\Delta x$ and $\Delta y$ values with the stored data of the one image with the stored masked image data of the other image to form a total image, comprising digital memories for storing the image data of the images and masks to be copied, buffer memories connected to said digital memories for synchronous release of the image and mask data, a computer unit connected to said buffer memories for performing the masking, a memory system connected to the computer unit for receiving the image, including a shifting system for the relative displacement of the images and masks to be copied into each other and comprising an address control system (35, 36 and 37) for the shifting in the scanning direction arranged between the digital memories (1, 2 and 3) and the buffer memories (30, 31 and 32); a control system (34) for moving images and masks transversely to the scanning direction, which is connected to the digital memories (35, 36 and 27) and comprising input-systems (33, 38) for feeding in values for shifting, ($\Delta x$, $\Delta y$) one of the input-systems (38) being connected to a first address control system (36 and 37) for the shifting in the scanning direction arranged between the digital memories (2 and 3) and the buffer memories (31 and 32) and the other input-system (33) being connected to a control system (34) for shifting the moving images and masks transversely to the scanning direction and connected to the first digital memories (1, 2, 3), and address control systems (35, 36 and 37) which are connected to the buffer memories (30, 31 and 32).

13. The system as defined in claim 12 characterized by providing between the digital memories (2 and 3) and the buffer memories (30 and/or 31) one data multiplexer (39, 40) for each through which at the times when no image data are read out of the digital memories, fixed data combinations are fed into the buffer memories.

* * * * *